United States Patent [19]
Abel

[11] Patent Number: 5,315,950
[45] Date of Patent: May 31, 1994

[54] AMPHIBIOUS VEHICLE

[76] Inventor: Gunther Abel, 8212 Alpin Way, Whistler, British Columbia, Canada, V0N 1B0

[21] Appl. No.: 6,772

[22] Filed: Jan. 21, 1993

[51] Int. Cl.⁵ .............................................. B63B 35/00
[52] U.S. Cl. .................................... 114/270; 114/151; 440/54
[58] Field of Search .................. 440/54, 40, 67; 114/151, 123, 270, 344

[56] References Cited

U.S. PATENT DOCUMENTS

| | | | |
|---|---|---|---|
| 3,483,843 | 12/1969 | Hawthorne | 440/54 |
| 3,760,764 | 9/1973 | Jones et al. | 114/344 X |
| 3,860,982 | 1/1975 | Rumsey | 114/344 |
| 3,899,992 | 8/1975 | Fuller | 440/67 X |
| 4,048,685 | 9/1977 | Gail | 114/344 |
| 4,802,433 | 2/1989 | Kovac | 114/270 |

FOREIGN PATENT DOCUMENTS

| | | | |
|---|---|---|---|
| 1083148 | 6/1960 | Fed. Rep. of Germany | 114/270 |
| 983939 | 2/1965 | United Kingdom | 114/270 |

Primary Examiner—Sherman Basinger

[57] ABSTRACT

An amphibious vehicle has a watertight vehicle body and at least two elongate buoyancy tanks, with a mechanism for displacing the buoyancy tanks between operative positions, in which the buoyancy tanks extend parallel to opposite sides of the vehicle body, and inoperative positions, in which the buoyancy tanks extend parallel to one another along the top of the roof of the vehicle body. A pair of propulsion units can be lowered from the vehicle body for supporting the vehicle during travel into a body of water and for propelling the vehicle through the water. Each propulsion unit comprises an elongate body, propellers in a duct extending longitudinally through the body and side openings from the duct to permit steering by rotation of the propellers.

14 Claims, 9 Drawing Sheets

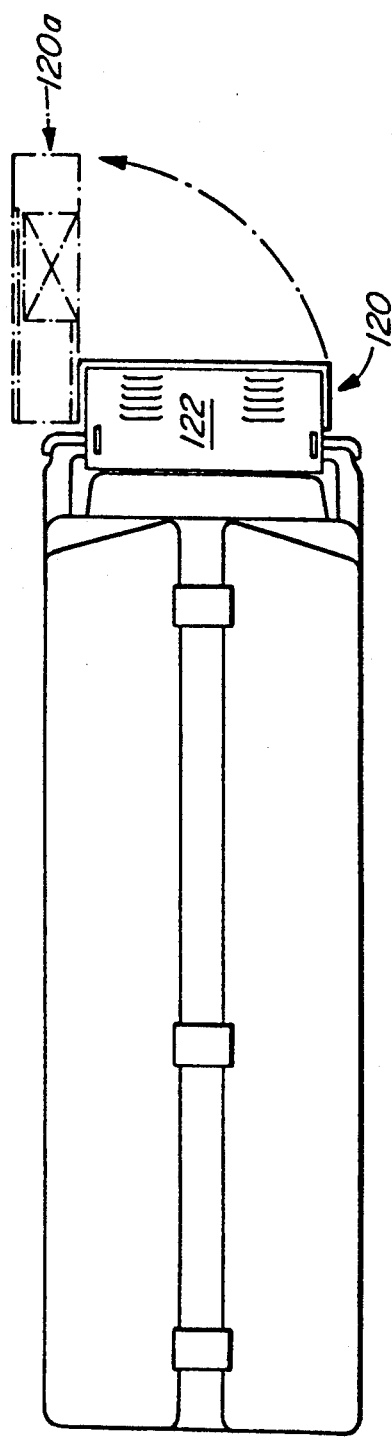
FIG. 11
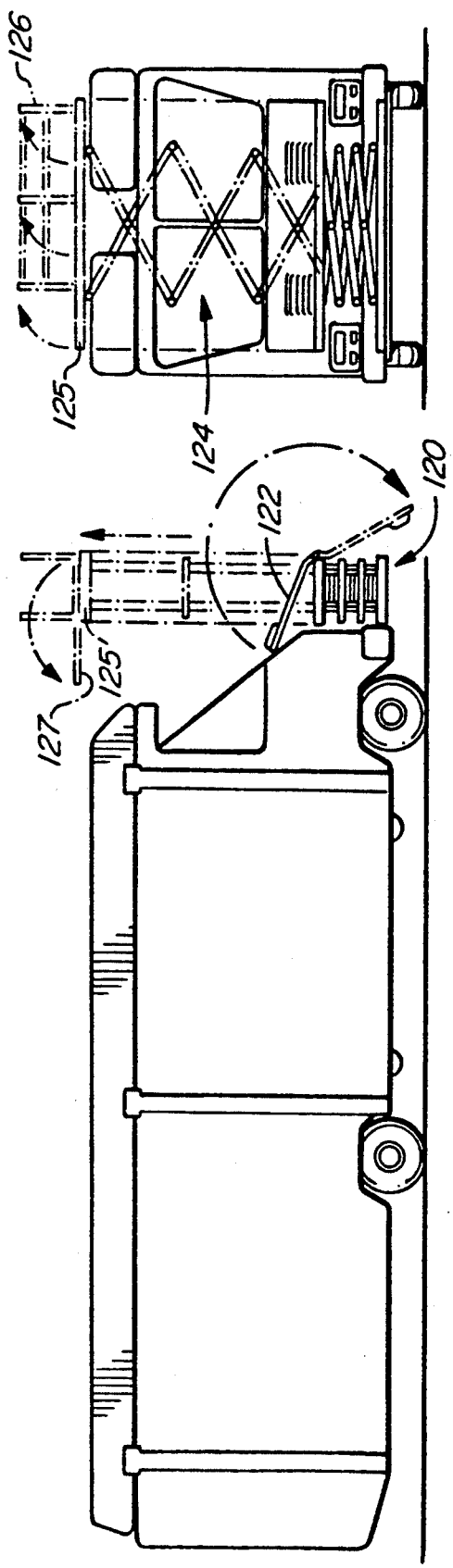
FIG. 13
FIG. 12

AMPHIBIOUS VEHICLE

BACKGROUND OF THE INVENTION

1. Field of the Invention

The present invention relates to amphibious vehicles and is useful in particular, but not exclusively, for recreation vehicles.

2. Description of Related Art

Various types of amphibious vehicles have been utilized in the past, and prior amphibious vehicles have usually, but not always, been designed and constructed for military use.

Such prior art vehicles have a watertight body supported on ground engagement wheels, with an engine for driving two or more of the wheels for propelling the vehicle along the ground, and may also have a propeller or other propulsion for propelling the vehicles through water.

However, relatively tall vehicles such as recreation vehicles have relatively high centers of gravity and, therefore, would be unstable when floated, in the manner of an amphibious vehicle, onto water.

SUMMARY OF THE INVENTION

It is accordingly an object of the present invention to provide a novel and improved amphibious vehicle providing buoyancy tanks for stabilizing the vehicle when it is floating in water.

According to the present invention, there is provided an amphibious vehicle, comprising a watertight vehicle body having opposite sides and a roof, at least two elongate buoyancy tanks and means for displacing the buoyancy tanks between operative positions, in which the buoyancy tanks extend parallel to the opposite sides of the vehicle body, and inoperative positions, in which the buoyancy tanks extend parallel to one another along the top of the roof of the vehicle body;

In the preferred embodiment of the invention, the vehicle body is provided with two pairs of buoyancy tanks, each of the pair being provided at opposite sides of the vehicle body. The buoyancy tanks are connected to the opposite sides of the vehicle body by longitudinally extensible and retractible piston and cylinder devices, which are used for displacing the buoyancy tanks between the operative and inoperative positions, with cable and winch devices for pulling the buoyancy tanks on the vehicle body roof into the inoperative positions.

BRIEF DESCRIPTION OF THE DRAWINGS

Further features, advantages and objects of the present invention will be more readily understood from the following description thereof, when taken in conjunction with the accompanying drawings, in which:

FIGS. 11, 12 and 13 show a plan view, a side elevation and a rear elevation respectively of another modification of the vehicle of FIG. 1.

DESCRIPTION OF THE PREFERRED EMBODIMENTS

Figure 1:
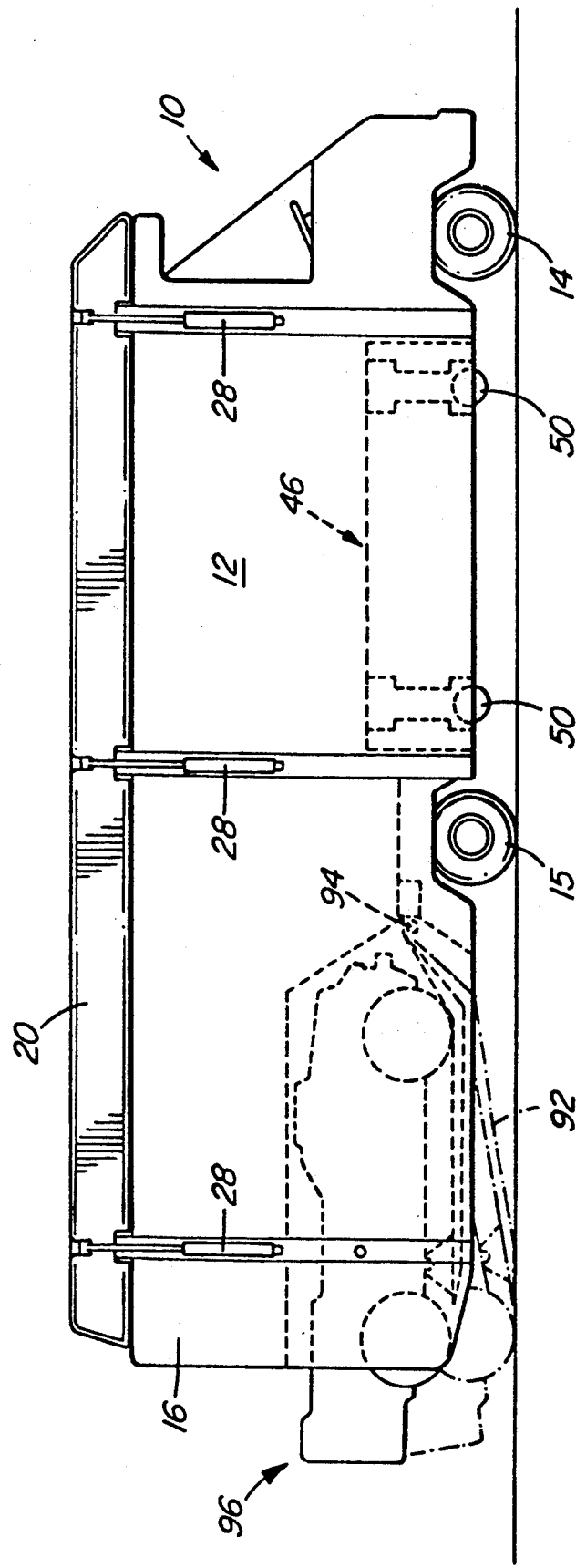
FIG. 1 shows a view in side elevation of an amphibious recreation vehicle.

In FIG. 1 of the accompanying drawings there is shown an amphibious recreation vehicle indicated generally by reference numeral 10, which has a watertight vehicle body 12 mounted on ground engagement wheels 14 for propelling the vehicle along the ground.

The vehicle 10 has opposite sides 16 and a roof 18, and two pairs of elongate buoyancy tanks 20 and 22 are carried on the roof 18 adjacent the opposite sides 16 of the vehicle body 12.

At each side of the vehicle, three pivot arms 24 are provided. Each of the arms is pivotally connected at one end, by a pivot connection 25, to the respective side of the vehicle body 12 and at its opposite end, by a pivot connection 26, to one side of one of the buoyancy tanks 20 and 22. The opposite side of each buoyancy tank is connected by a pivot connection 27 to one end of a respective piston and cylinder device 28, the opposite end of which is connected by a pivot connection 29 to the midpoint of a respective one of the pivot arms 24.

Cables 30 are connected to the sides of the buoyancy tanks at which the pivot connections 27 are provided, and extend to winches 31 which are mounted side-by-side on the roof 18 of the vehicle body 12. The winches 31 are driven by a pair of hydraulic motors and are connected to the motors by a pair of shafts 33.

Figure 2:
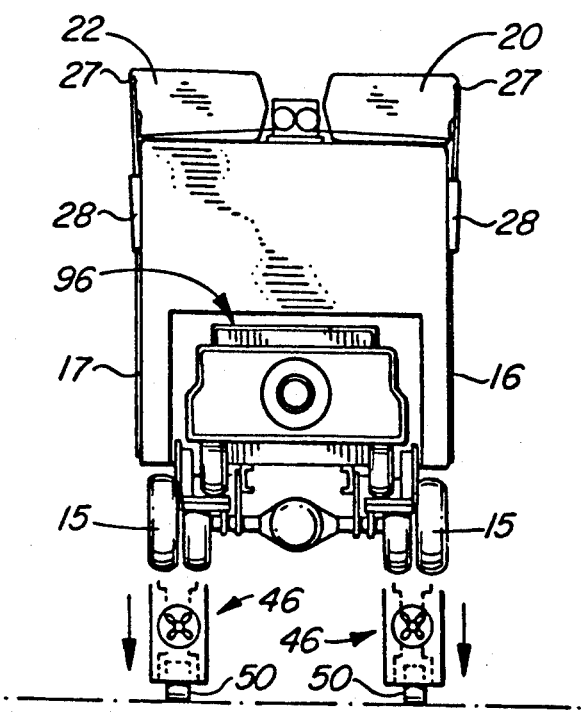
FIG. 2 shows a view in rear elevation of the vehicle of FIG. 1, with buoyancy tanks being displaced between operative and inoperative positions.

By means of the piston and cylinder devices 28 and the winches 31, the buoyancy tanks 20 and 22 can be displaced between inoperative positions, in which they are shown in FIG. 2, and in which they are located on top of the vehicle body roof 18, and operative positions, in which they are shown in unbroken lines in FIG. 2.

In their operative positions, the buoyancy tanks 20 and 22 extend parallel to the opposite sides 16 and 17 of the vehicle body 12, and are spaced horizontally from the vehicle wheels 14 in the transverse direction of the vehicle 10.

Figure 3:
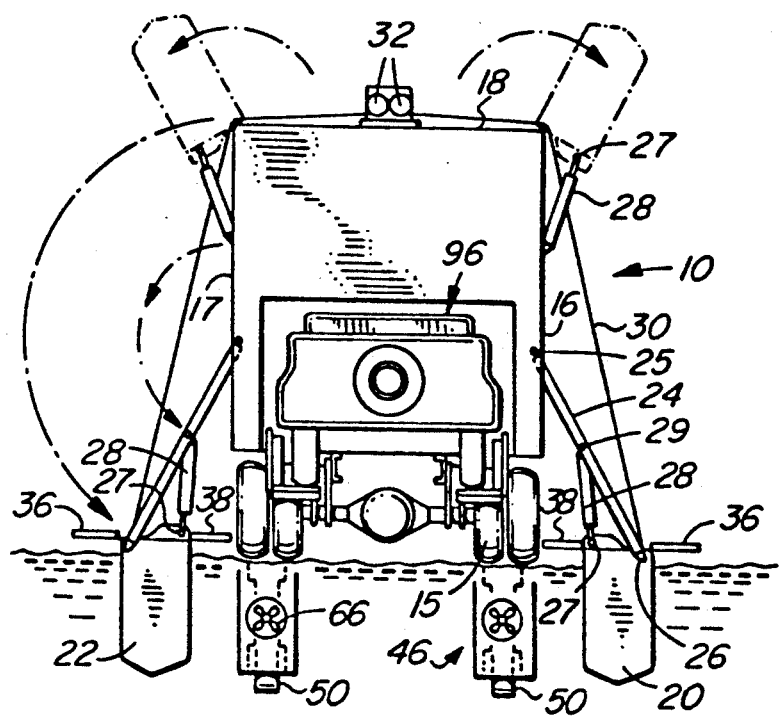
FIG. 3 shows a view corresponding to FIG. 2, but with part of the rear of the vehicle removed to show propulsion devices and associated mechanisms.

As illustrated in FIG. 3, the buoyancy tanks 20 and 22 are moved from their inoperative positions to their operative positions by firstly contracting the piston and cylinder devices 28, to cause the buoyancy tanks to tilt from their inoperative positions to the positions in which they are shown in broken lines in FIG. 3.

The winches 31 are then operated to unwind the cables 30 gradually from the winches 31, so that the pivot arms 24, carrying the buoyancy tanks on the free ends of the pivot arms 24, can pivot downwardly about the pivot connections 25 to lower the buoyancy tanks 20 and 22 into a body of water 34, for the purpose explained below.

Each of the buoyancy tanks is provided with two platforms 36 and 38, which are pivotally connected to the buoyancy tanks so as to allow the platforms 36 and 38 to pivot between storage positions, adjacent to their respective buoyancy tanks, when the tanks are in the inoperative positions in which they are shown in FIG. 2, and extended positions, in which they are shown in FIG. 3, and in which they project laterally from their respective buoyancy tanks and flush with the tops thereof.

Figure 4:
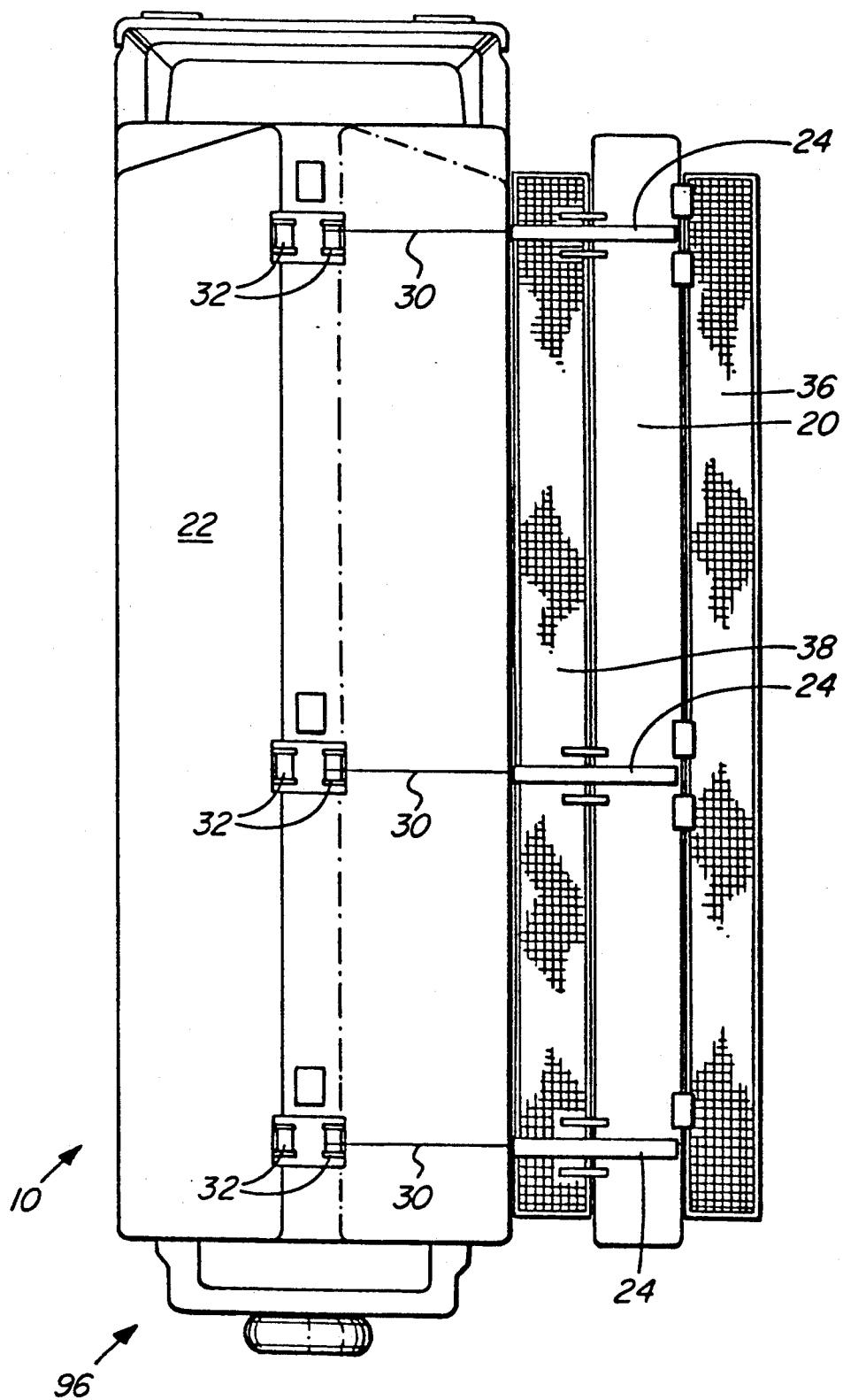
FIG. 4 shows a broken-away plan view of parts of the vehicle with two of the buoyancy tanks in their operative positions.
Figure 5:
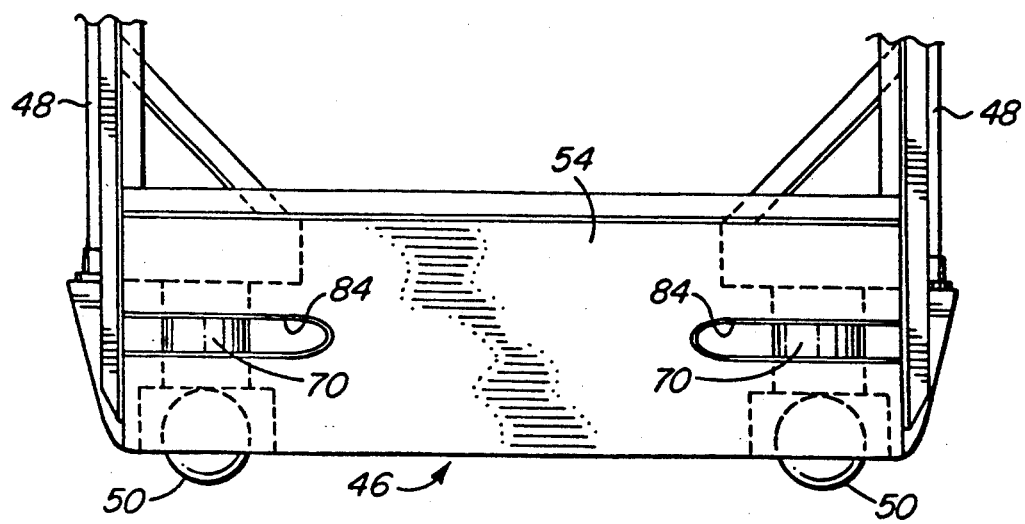
FIG. 5 shows a broken-away view, in side elevation of one of the propulsion devices of the vehicle of FIGS. 1-4.
Figure 5A:
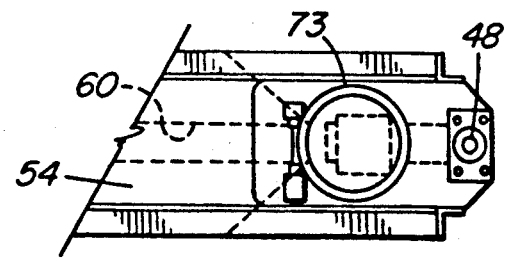
FIGS. 5A and 5B show a broken-away plan view and a broken-away end elevation view, respectively, of parts of the propulsion device of FIG. 5.
Figure 6:
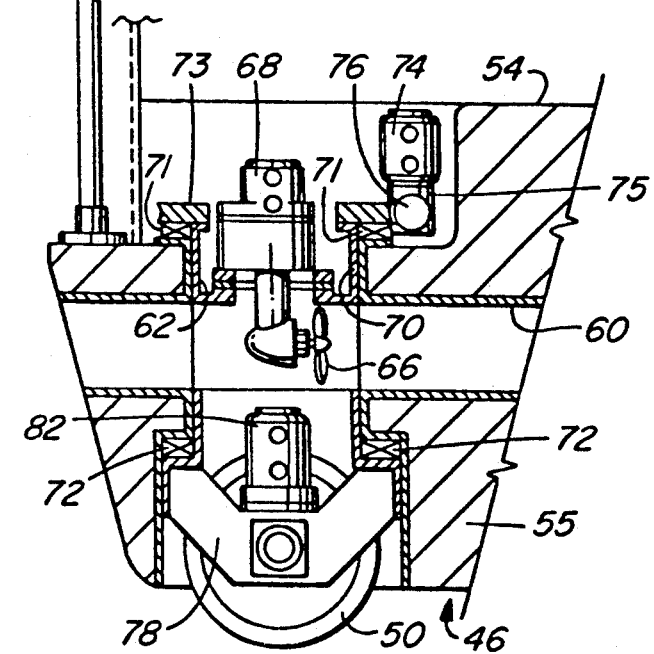
FIG. 6 shows a broken-away view, in perspective, of parts of the propulsion device of FIG. 5.

The tank 20 is shown in FIG. 4 in its lowered, operative position with the platforms 36 and 38 extended. As illustrated in FIG. 4, the platforms 36 and 38 are in the form of gratings.

The amphibious vehicle 10 is also provided with two elongate propulsion units, indicated generally by reference numerals 46 in FIG. 3, which are parallel to one another and spaced apart in the transverse direction of the vehicle. Each propulsion unit 46 is vertically displaceable between a raised position, in which one of the propulsion units 46 is shown in broken lines in FIG. 1, and in which the propulsion units are located within the vehicle body 12, and a lowered position, in which the propulsion units 46 are shown in FIG. 3. In their lowered positions, the propulsion units project beneath the vehicle body 12 at a vertical spacing from the underside of the vehicle body 12. The propulsion units 46 may be longitudinally extensible in their lowered positions.

The vertical displacement of the propulsion units 46 is effected by means of hydraulic piston and cylinder devices 48 connected between the vehicle body and the propulsion devices 48.

Each propulsion unit 46 is provided with two ground engagement wheels 50 so that the vehicle 10 can travel on the wheels 50 when the vehicle 10 is being moved along the ground towards the body of water 34 for immersion in the water.

Consequently, the buoyancy tanks 20 and 22 can be lowered into their operative positions prior to or during the entry of the vehicle 10 into the water, so that the vehicle 10 is stabilized immediately upon entering the water.

As shown in FIGS. 5, 5A, 5B and 6, each of the propulsion devices 46 has an elongate housing 54, with streamlined opposite ends shaped somewhat like the bows of a boat to facilitate propulsion of the housings 54 through the water, and the housings 54 are filled with a foam material 55 to provide buoyancy.

A water duct in the form of a cylindrical tube 60 extends longitudinally through each housing 54 and is open at the opposite ends thereof.

Each tube 60 is interrupted, adjacent each of the opposite ends of the respective housing 54, by a vertical shaft 62 which contains a propeller 66.

The propeller 66 is suspended from a drive motor 68, which is mounted on a rotatable housing 70. By means of bearings 71 and 72, the housing 70 is rotatably mounted in the vertical shaft 62.

A ring gear 73, which is mounted on and fixed to the rotatable housing 70, meshes with a worm gear 76, which is rotated by a drive motor 74 through a reduction gearing 75. In this way, the propeller 66 can be rotated, about the vertical axis of the drive motor 68, for the purpose of steering the vehicle, as described in greater detail below.

The rotatable housing 70 is mounted on an undercarriage 78, in which one of the ground engagement wheels 50 is journalled. The undercarriage 78 carries a drive motor 82 for rotating the wheel 50.

When the propulsion devices 46 are displaced downwardly, into the positions in which they are shown in FIG. 2, the wheels 50 are thereby displaced into engagement with the ground, so that the wheels 14 and 15 are raised from the ground. The vehicle is then supported on the wheels 50 and, by operation of the drive motor 74 and consequential rotation of the rotatable housings 70, the wheels 50 can be rotated, about vertical axes for the purpose of steering the vehicle, while the vehicle is driven forward by rotation of the wheels 50 about their horizontal axes by means of the drive motors 82.

The housing 54 is interrupted, at each end thereof, and at each side thereof, by horizontally elongate, lateral openings 84, which provide communication between the interior of the tube 60, and the exterior of the propulsion device 46. Consequently, the water impelled along the tube 60 can be discharged from the rube 60 not only along the axis of the tube 60 but, by rotation of the propeller 66 about its vertical axis, at a horizontal angle relative to the longitudinal axis of the tube 60, through the respective lateral opening. Thus, by operating the drive motor 74 to rotate the ring gear 73, while the propeller 66 is being driven by the motor 68, the direction at which water is discharged from the housing 54 by the propeller 66 through the openings 84, can be selectively varied in order to steer the vehicle in a desired direction of movement through the water on which the vehicle is floating.

Figure 7:
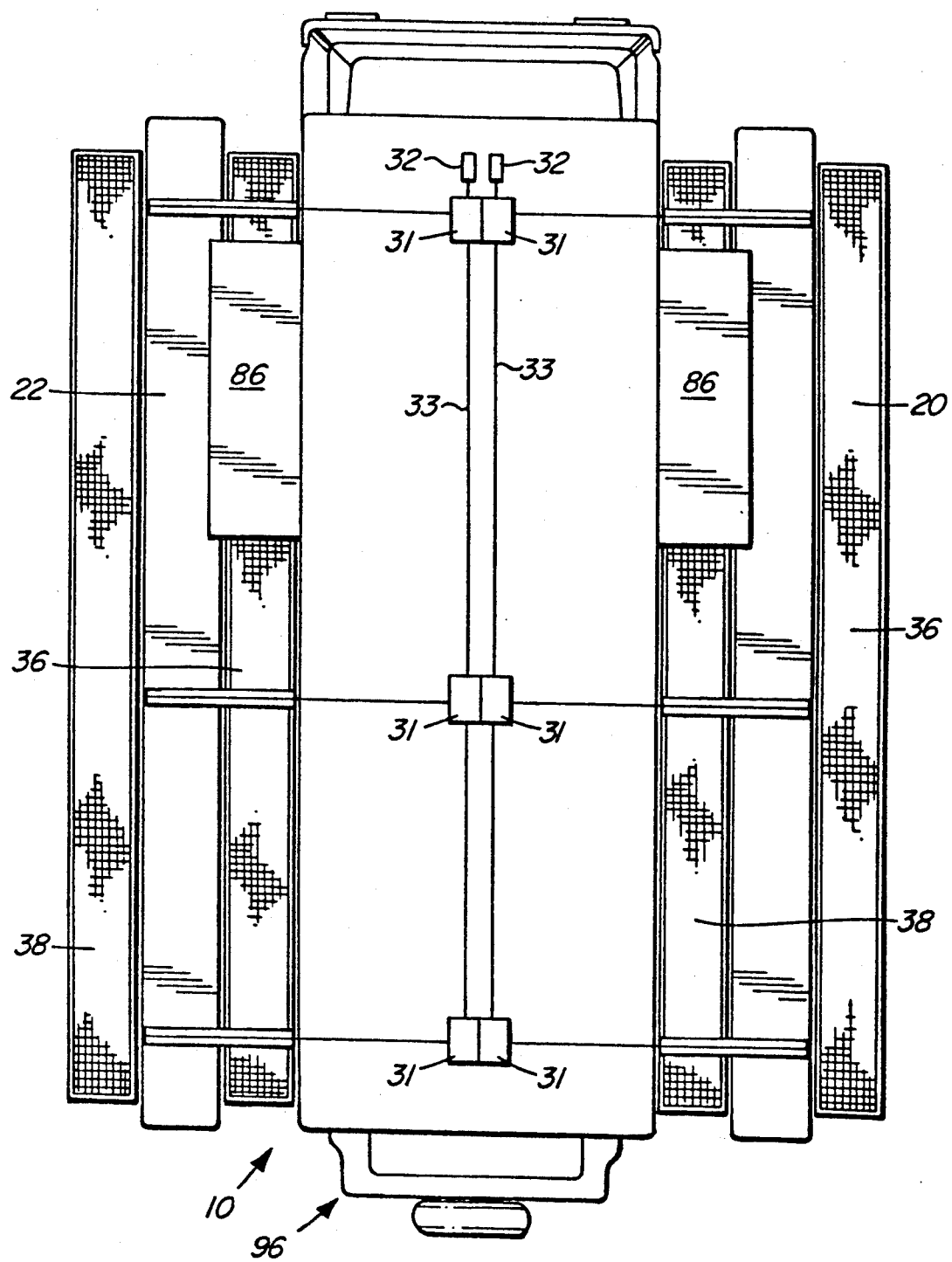
FIG. 7 shows a plan view, of a modification of the vehicle of FIG. 1.

As shown in FIG. 7, the vehicle body 12 may also provided with laterally extensible and retractible auxiliary chambers 86. By displacing these chambers 86 outwardly of the vehicle body 12, into the positions in which they are shown in FIG. 7, the interior volume of the vehicle 10 can be correspondingly increased.

Figure 8:
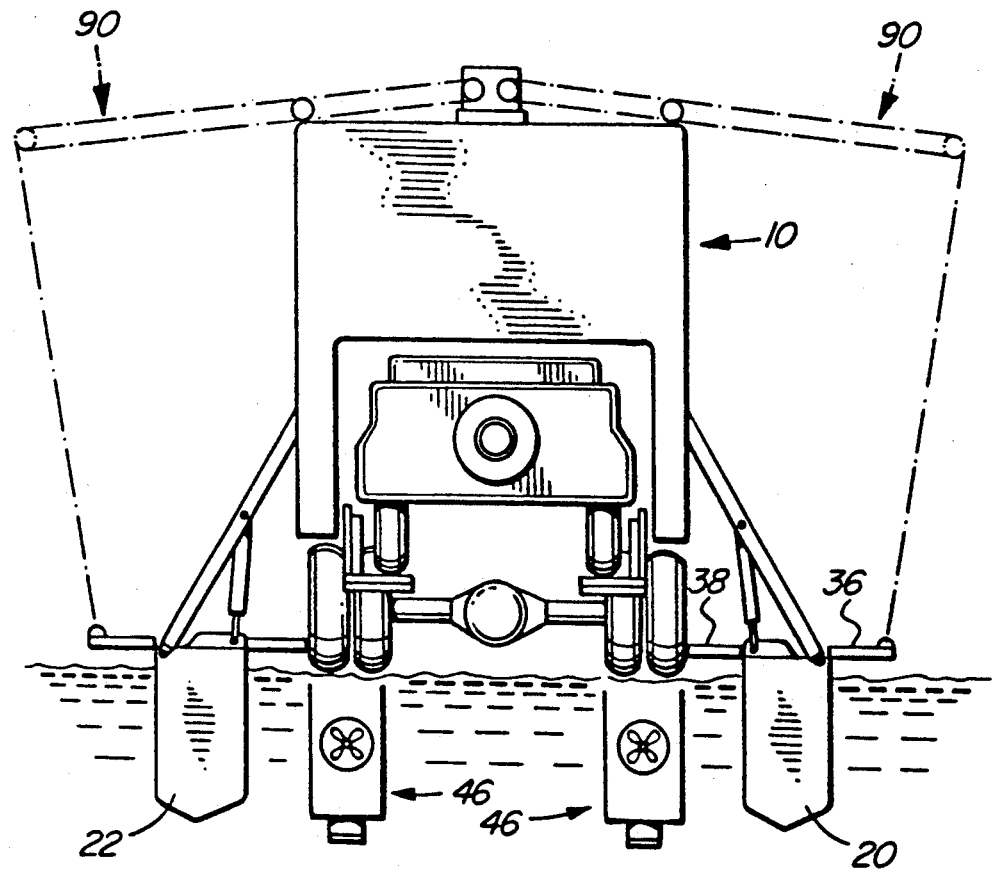
FIG. 8 shows a view in rear elevation of a further modification of the vehicle in FIG. 1.
Figure 5B:
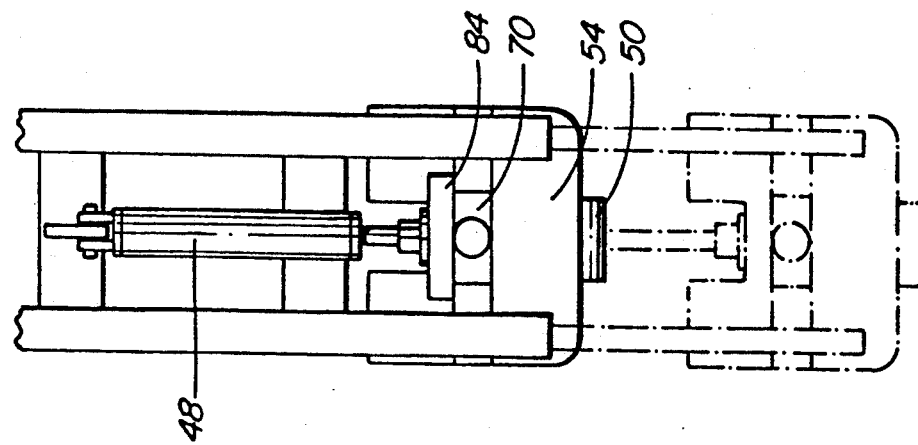
Figure 9:
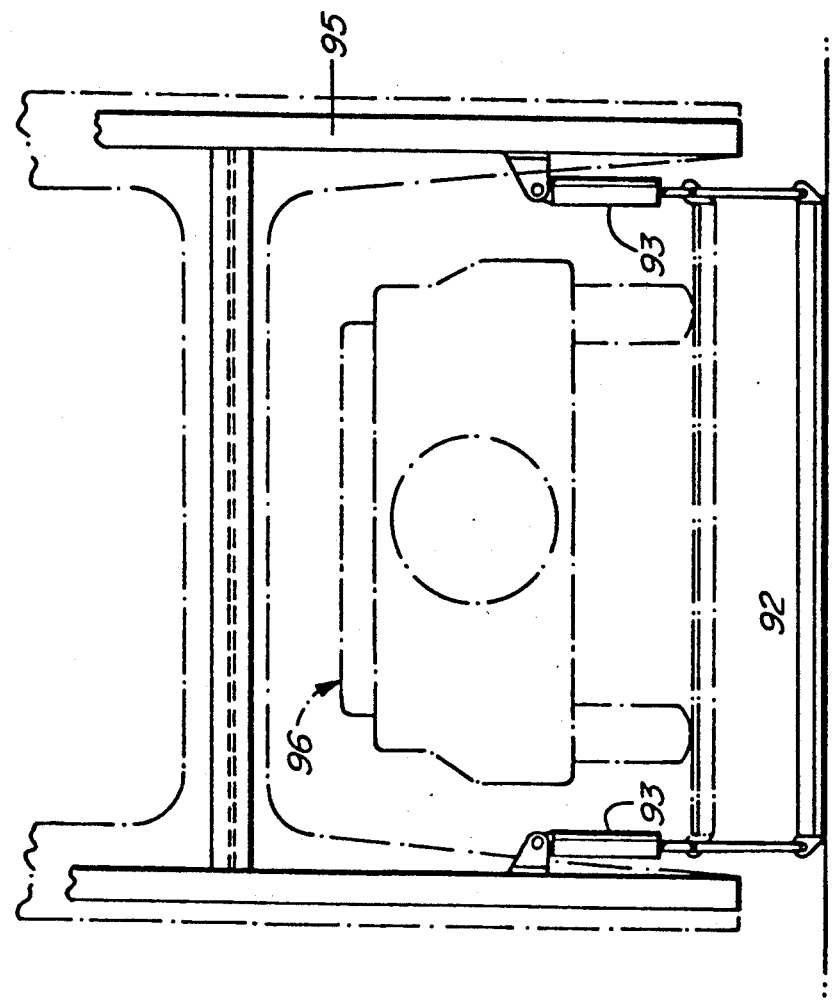
FIG. 9 shows a broken-away view, in rear elevation, of the vehicle of FIG. 1.

As shown in FIG. 8, it is also possible to provide the vehicle 10 with laterally extensible and contractible awnings or tent-like structures, indicated generally by reference numerals 90 which are made of flexible sheet material and which can be used to provide weather protection over the buoyancy tanks and their platforms 36 and 38.

As shown in FIGS. 1, 2, 3 and 9, the vehicle 10 is provided, at the rear end thereof, with a ramp 92, which is pivotally connected to the vehicle 10 by means of a horizontal pivot 94 so as to be pivotable between raised and lowered positions, shown in dash-dot lines in FIG. 1. The ramp can be raised and lowered by means of hydraulic piston and cylinder devices 93 (FIG. 9), which are connected between the ramp 92 and a framework 95 of the vehicle body 12. This ramp 92 is utilized to enable an auxiliary vehicle, e.g. a run-about vehicle, shown partly in broken lines in FIG. 1 and indicated generally by reference number 96, to be received, at least partially, into the vehicle 10. Such auxiliary vehicles are very useful to enable the users of the recreation vehicle 10 to park the recreation vehicle in a convenient location, and then to travel from that location, e.g. into the centre of town or other areas having restricted or crowded road conditions, using the relatively small auxiliary vehicle 96 instead of the large and cumbersome recreation vehicle 10.

Figure 10:
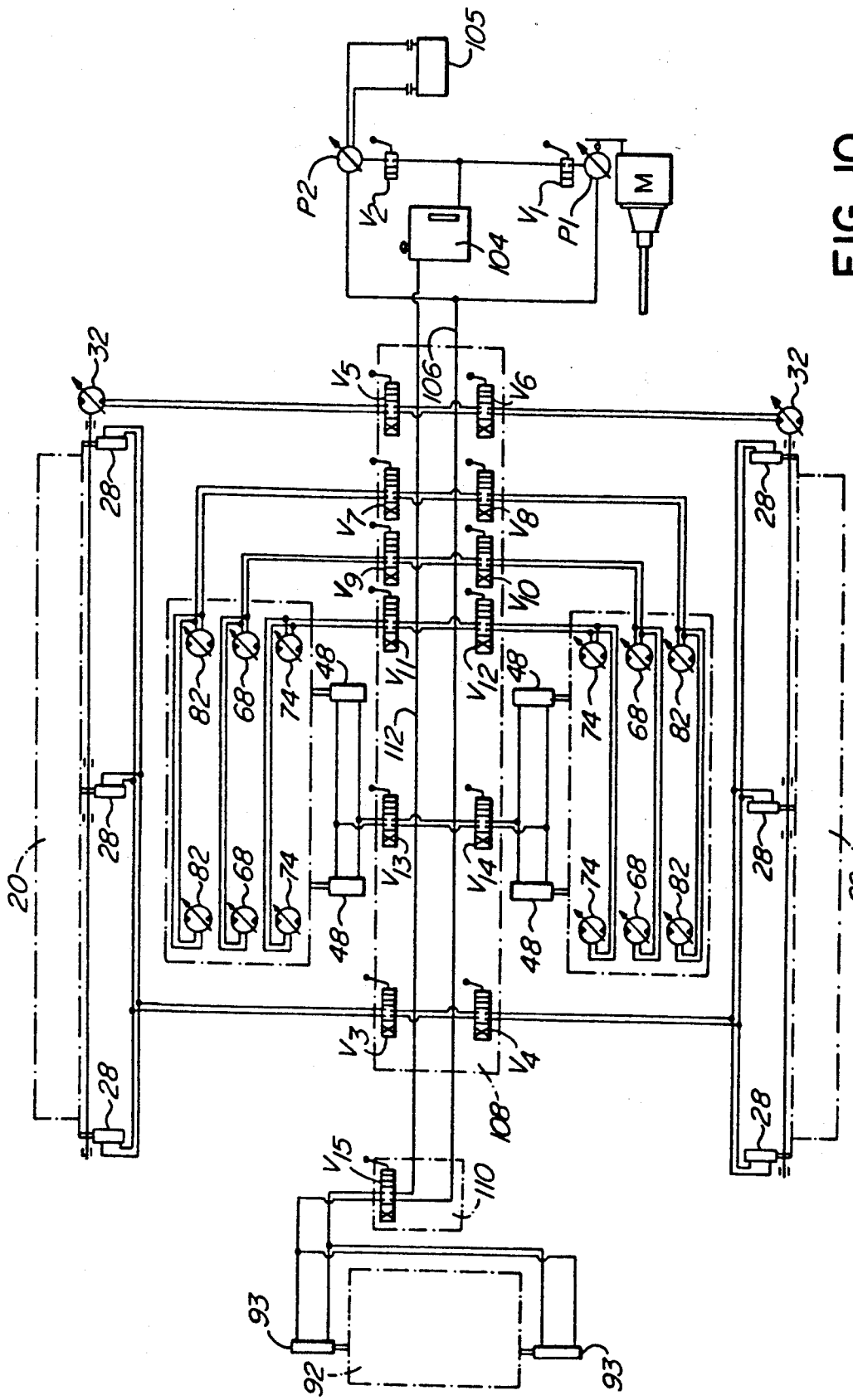
FIG. 10 show a hydraulic circuit diagram of the hydraulic actuation system of the vehicle of FIG. 1.

The hydraulic circuit of the vehicle 10 is illustrated in FIG. 10 employs a hydraulic pump P1 which is driven by the internal combustion engine 102 of the vehicle 10, to supply hydraulic fluid under pressure from a reservoir 104 under the control of a manually operable slide valve $v_1$ to a pressure line 106. An emergency pump P2, powered by a battery 105, is provided for pressurizing the fluid from the reservoir 104, and supplying it to the pressure line 106 under the control of a manually operable slide valve $v_2$, when the engine 102 is not running.

The pressure line 106 is connected to slide valves $v_3$ through $v_{14}$, which are mounted on a main control panel 108 and are manually actuatable for controlling the supply of hydraulic fluid to various components of the vehicle, as described in greater detail below.

The pressure line 106 also supplies fluid to a further slide valve $v_{15}$, which is mounted on an auxiliary control panel 110 and which is operable to control the actuation of the piston and cylinder devices 93 for raising and lowering the ramp 92. The auxiliary control panel 110 is located in the vicinity of the ramp 92 so as to be conveniently accessible by a person operating the ramp 92, while the main control panel 108 is provided in the vicinity of the drivers seat in the vehicle 10.

The valves $v_3$ and $v_4$ control the supply of fluid to the piston and cylinder devices 28 for raising and lowering the buoyancy tanks and the valves $v_5$ and $v_6$ control the supply of fluid to the winche motors.

The valves $v_7$ and $v_8$ control the drive motors 82 for driving the vehicle when the wheels 50 are in contact with the ground; the valves $v_9$ and $v_{10}$ control the hydraulic motors 68 for driving the propellers 66 and the valves $v_{11}$ and $v_{12}$ control the hydraulic motors 74 for steering the vehicle when it is being thus propelled.

The operation of the piston and cylinder devices 48 for raising and lowering the propulsion devices 46 is controlled by the valves $v_{13}$ and $v_{14}$.

The fluid returning from these various devices through the valves $v_3$ through $v_{14}$ is fed through a return line 112 to the reservoir 104.

The modification of the vehicle 10 of FIG. 1 which is illustrated in FIGS. 11, 12 and 13 has, mounted on the front of the vehicle 10, an auxiliary housing indicated generally by reference numeral 120.

As diagrammatically illustrated in FIG. 11, the auxiliary housing 120 can be pivoted, about a vertical pivot axis at one corner thereof, relative to the vehicle 10 into the position shown in broken lines in FIG. 11 and indicated generally by reference numeral 120a.

The auxiliary housing 120 has a cover 122, which can be pivoted forwardly, about a horizontal axis, into the position shown in broken lines in FIG. 12, in order to thereby open the top of the auxiliary housing 120.

A parallel motion or scissors mechanism indicated generally be reference numeral 124 can then be extended vertically upwardly from the interior of the housing 120, in order to correspondingly raise a platform 125.

The platform 125 may be provided with pivotally collapsible handrails 126 and a pivotably extensible platform extension 127.

Various other modifications may be made to the above-described vehicle within the scope of the invention as defined by the appended claims.

I claim:

1. An amphibious vehicle, comprising:
a vehicle body;
said vehicle body having first ground engagement wheels on which said vehicle can travel along the ground;
buoyancy tanks for supporting the vehicle on water;
means for displacing said buoyancy tanks between raised, inoperative positions and lowered, operative positions;
a propulsion device for propelling said vehicle when said vehicle is floating in the water;
second ground engagement wheels for use on entering and leaving the water;
said second engagement wheels being movable between raised, inoperative positions and lowered, operative positions in which said second ground engagement wheels support said vehicle above the ground so as to allow said buoyancy tanks to be lowered into the operative positions thereof; and
means for displacing said second ground engagement wheels between the lowered and raised positions thereof.

2. An amphibious vehicle as claimed in claim 1, wherein said means for displacing said buoyancy tanks comprise piston and cylinder devices connected between each of said tanks and the respective side of said vehicle body for raising and lowering said buoyancy tanks between said operative positions and said roof of said vehicle body by longitudinal extension and contraction of said piston and cylinder devices; and pivotal connections between said piston and cylinder devices and said buoyancy tanks and said vehicle body, said pivotal connections permitting partial rotation of said buoyancy tanks about longitudinal axes of said buoyancy tanks between said operative and inoperative positions.

3. An amphibious vehicle as claimed in claim 2, further comprising cable and winch means mounted on said roof of said vehicle body and connected to said buoyancy tanks for drawing said buoyancy tanks onto said roof as said buoyancy tanks are displaced into the inoperative positions.

4. An amphibious vehicle as claimed in claim 3, further comprising arms at opposite sides of said vehicle body, first pivot connections pivotally connecting one end of each of said arms and said vehicle body, second pivot connections pivotally connecting opposite ends of said arms to said buoyancy tanks, third pivot connections pivotally connecting one end of each of said piston and cylinder devices to an intermediate portion of a respective one of said arms and a fourth pivot connection pivotally connecting opposite ends of said piston and cylinder devices to said buoyancy tanks.

5. An amphibious vehicle as claimed in claim 1, further comprising at least one platform on each of said buoyancy tanks, and pivotal connections between said platforms and said buoyancy tanks and permitting each of said platforms to pivot between a storage position adjacent the respective buoyancy tank and an extended position flush with a top surface of the respective buoyancy tank.

6. An amphibious vehicle as claimed in claim 1, wherein said propulsion device comprises an elongate housing; a water duct extending longitudinally through said elongate housing and open at opposite ends of said housing; and at least one propeller in said water duct.

7. An amphibious vehicle as claimed in claim 6, said housing having openings in opposite sides thereof to accommodate discharge of water by said propeller at angle to the longitudinal axis of said duct; and further comprising means for angle to the longitudinal axis of said duct; and further comprising means for adjustably pivoting said propeller about a vertical axis for correspondingly steering said vehicle.

8. An amphibious vehicle as claimed in claim 1, wherein said propulsion device is one of a pair of propulsion devices extending parallel to one another along said vehicle body and spaced apart in the transverse direction of said vehicle body.

9. An amphibious vehicle as claimed in claim 1, wherein said second ground engagement wheels are rotatably mounted in said propulsion device, said displacing means comprising means for raising and lowering said propulsion device relative to said vehicle body.

10. An amphibious vehicle as claimed in claim 1, further comprising means for rotating said second ground engagement wheels about vertical axes for steering said vehicle.

11. An amphibious vehicle as claimed in claim 1, further comprising means for driving said second ground engagement wheels so as to drive said vehicle along the ground.

12. An amphibious vehicle as claimed in claim 1, further comprising a ramp at rear end of said vehicle body for receiving an auxiliary vehicle at least partly into said vehicle body, and means for displacing said ramp between lowered and raised positions.

13. An amphibious vehicle as claimed in claim 1, wherein said vehicle body is provided with awnings extensible laterally of said vehicle body.

14. An amphibious vehicle as claimed in claim 1, further comprising a platform mounted on the front of said vehicle body and a displacement mechanism for raising and lowering said platform.

* * * * *